United States Patent
Casparian et al.

(10) Patent No.: US 9,389,711 B2
(45) Date of Patent: Jul. 12, 2016

(54) ARCHITECTURE FOR VARIABLE PRESSURE MOUSE

(71) Applicant: Dell Products, LP, Round Rock, TX (US)

(72) Inventors: Mark A. Casparian, Miami, FL (US); Carlos L. Ross, Miami, FL (US); Danae Sierra, Miami, FL (US); Frank C. Azor, Palmetto Bay, FL (US); A. Fleming Seay, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 672 days.

(21) Appl. No.: 13/725,552

(22) Filed: Dec. 21, 2012

(65) Prior Publication Data

US 2014/0176441 A1    Jun. 26, 2014

(51) Int. Cl.
  *G06F 3/038*    (2013.01)
  *G06F 3/0354*   (2013.01)

(52) U.S. Cl.
  CPC .............. *G06F 3/038* (2013.01); *G06F 3/0383* (2013.01); *G06F 3/03543* (2013.01)

(58) Field of Classification Search
  CPC .............. G06F 3/038–3/0395; G06F 3/03543; G06F 3/0383; G06F 3/03541; G06F 3/0487
  USPC ................................. 345/156–184
  See application file for complete search history.

(56) References Cited

U.S. PATENT DOCUMENTS

| | | | |
|---|---|---|---|
| 5,345,807 A | 9/1994 | Butts et al. | |
| 5,434,566 A | 7/1995 | Iwasa et al. | |
| 5,515,040 A | 5/1996 | Lee et al. | |
| 5,574,858 A | 11/1996 | Witte | |
| 5,790,102 A | 8/1998 | Nassimi | |
| 6,098,184 A | 8/2000 | Patterson, Jr. | |
| 6,107,997 A | 8/2000 | Ure | |
| 6,135,886 A | 10/2000 | Armstrong | |
| 6,166,723 A | 12/2000 | Schena et al. | |
| 6,198,473 B1* | 3/2001 | Armstrong | 345/163 |
| 6,587,093 B1 | 7/2003 | Shaw et al. | |
| 7,024,625 B2 | 4/2006 | Shali | |
| 7,136,045 B2 | 11/2006 | Rosenberg et al. | |
| 7,710,397 B2 | 5/2010 | Krah et al. | |
| 7,817,135 B2 | 10/2010 | Shaw et al. | |
| 8,035,616 B2 | 10/2011 | Shaw et al. | |
| 8,243,018 B2 | 8/2012 | Farag et al. | |
| 2002/0084986 A1* | 7/2002 | Armstrong | 345/163 |
| 2009/0140985 A1 | 6/2009 | Liu | |
| 2010/0127983 A1* | 5/2010 | Irani et al. | 345/163 |
| 2010/0148999 A1 | 6/2010 | Casparian et al. | |
| 2010/0201626 A1 | 8/2010 | Krah et al. | |
| 2010/0321301 A1* | 12/2010 | Casparian et al. | 345/168 |
| 2011/0095877 A1* | 4/2011 | Casparian et al. | 340/407.2 |
| 2012/0013272 A1* | 1/2012 | Huang et al. | 315/312 |
| 2013/0067126 A1* | 3/2013 | Casparian et al. | 710/73 |

* cited by examiner

*Primary Examiner* — Dmitriy Bolotin
(74) *Attorney, Agent, or Firm* — Larson Newman, LLP

(57) ABSTRACT

User input devices with variable pressure buttons are configured. A user may specify a range of pressure to be associated with a pressure level. In some embodiments, a user may also associate a command or other instruction to an application with an identity of a variable pressure button and a pressure level of the button. In some embodiments, the associations may be represented in a configuration profile. In further embodiments, a microcontroller for a mouse may translate signals from variable pressure buttons into pressure levels based upon the configuration file. In many embodiments, a user may associate a reporting rate with a variable pressure button. A legacy application may receive reports of the state of the variable pressure button at the associated reporting rate.

13 Claims, 4 Drawing Sheets

ARCHITECTURE FOR VARIABLE PRESSURE MOUSE

FIELD OF THE DISCLOSURE

This disclosure generally relates to information handling systems, and more particularly relates to software architectures for input devices with pressure sensitive sensors.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Input devices for information handling systems may be pressure sensitive.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
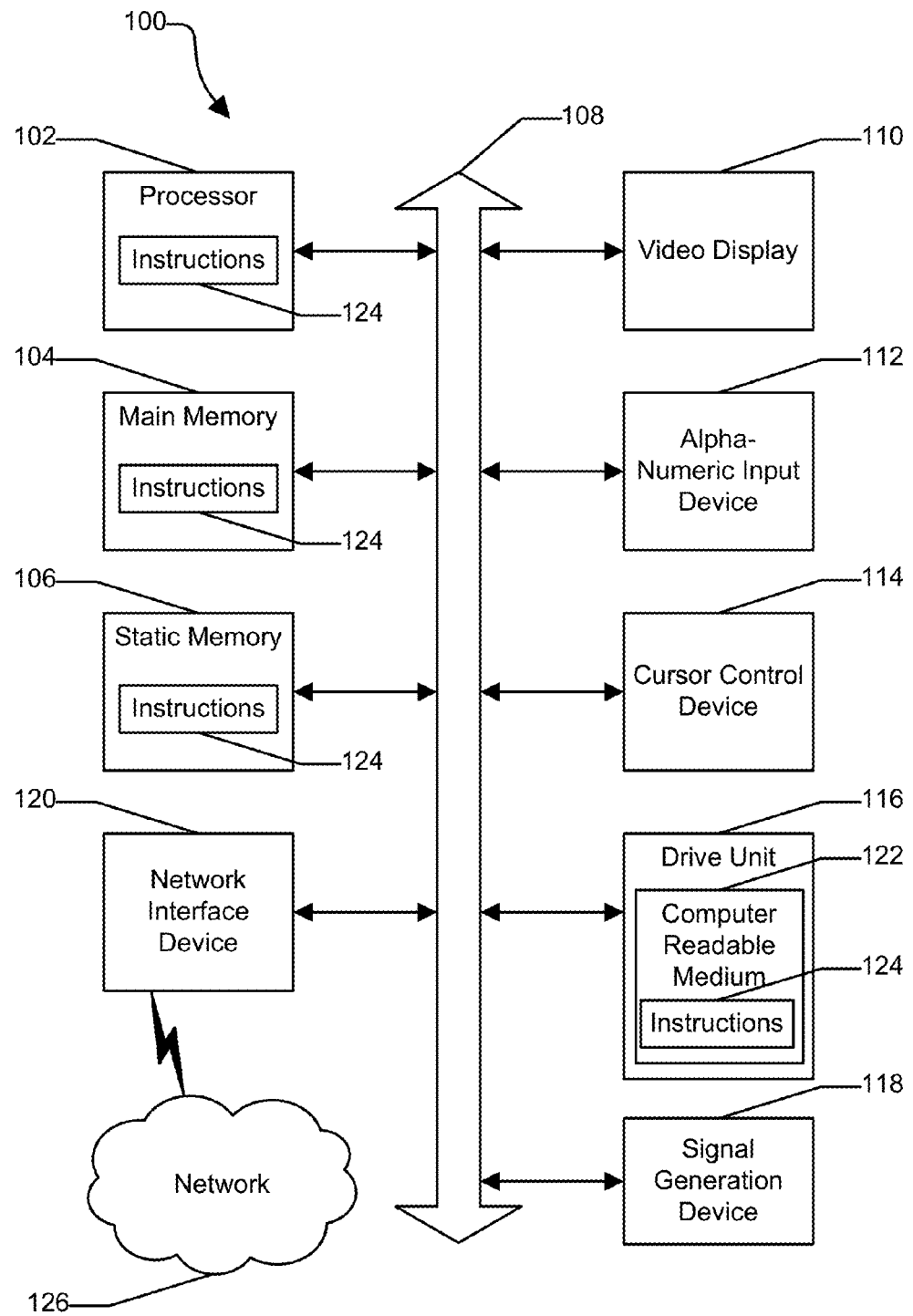
FIG. 1 illustrates a block diagram of an information handling system according to one exemplary embodiment of the disclosed systems and methods.

FIG. 1 shows an information handling system 100 capable of administering each of the specific embodiments of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an alpha-numeric input device 112, such as a keyboard, and a cursor control device 114, such as a mouse. Sensors on components, such as mouse buttons, of cursor control device 114 may detect the amount of pressure applied by a user and generate analog signals to represent the amount of pressure. In some embodiments, sensors on other components of cursor control device 114, such as other mouse buttons, may provide digital signals. In other embodiments, an information handling system may contain other input devices with sensors that generate analog signals, such as a joystick, a helmet, a wireless gun, a game pad, a virtual reality gaming device such as a head display with a tracking device, a gaming controller, or a button-centric device other than a mouse. These input devices may contain components other than buttons which generate analog signals. The joystick, for example, may have sensors indicating the speed of movement, the amount of pressure applied to a key or button, or even grip strength.

The information handling system 100 can also include a disk drive unit 116, a signal generation device 118, such as a speaker or remote control, and a network interface device 120. The information handling system 100 can represent a server device whose resources can be shared by multiple client devices, or it can represent an individual client device, such as a desktop personal computer.

The information handling system 100 can include a set of instructions that can be executed to cause the system to perform any one or more of the methods or computer based functions disclosed herein. The system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Further, the instructions 124 may embody one or more of the methods or logic as described herein. In a particular embodiment, the instructions 124 may reside completely, or at least partially, within the main memory 104, the static memory 106, and/or within the processor 102 during execution by the information handling system 100. The main memory 104 and the processor 102 also may include computer-readable media. The network interface device 120 can provide connectivity to a network 126 such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 124 or receives and executes instructions 124 responsive to a propagated signal; so that a device connected to a network 126 can communicate voice, video or data over the network 126. Further, the instructions 124 may be transmitted or received over the network 126 via the network interface device 120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
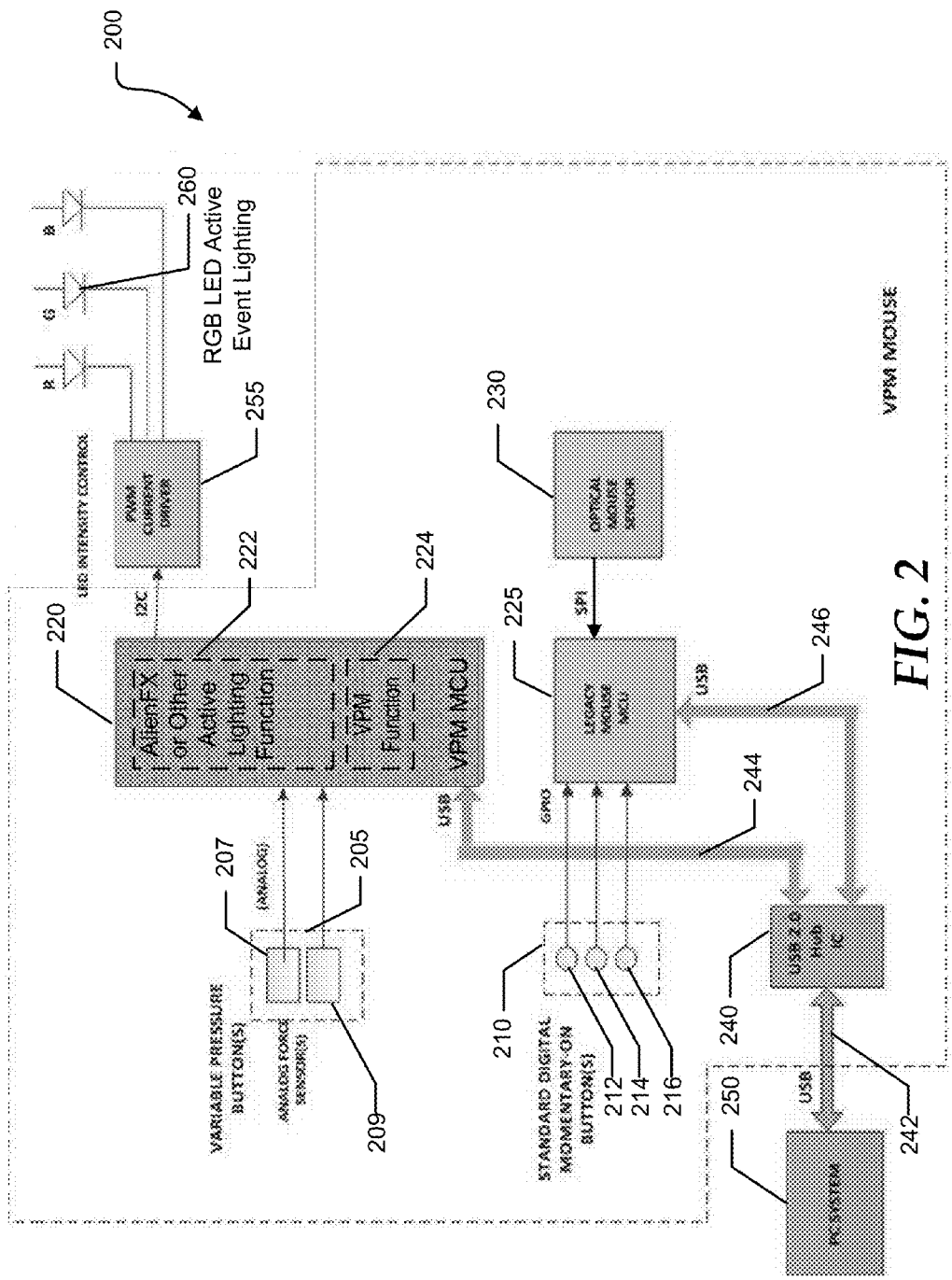
FIG. 2 illustrates a block diagram of a mouse with variable pressure buttons according to one exemplary embodiment of the disclosed systems and methods.

FIG. 2 shows a variable pressure mouse (VPM) 200 connected to PC system 250 through a universal serial bus (USB) connection 242. VPM 200 includes variable pressure buttons mechanism 205, standard digital buttons 210, VPM microcontroller (MCU) 220, legacy mouse MCU 225, optical mouse sensor 230, pulse width modulation (PWM) current driver 255, and USB 2.0 hub integrated circuit (IC) 240. Variable pressure buttons mechanism 205 includes variable pressure buttons 207 and 209 and one or more analog force sensors. Variable pressure buttons 207 and 209 represent buttons that are detected as being depressed by a variable amount or with a variable amount of pressure. When a variable pressure button is depressed, a pressure sensitive sensor of variable pressure buttons mechanism 205 may measure the pressure, generate an analog signal representative of the force or extent to which the variable pressure button is depressed, and transmit it to VPM MCU 220. The pressure sensitive sensor may be implemented using variable capacitance, variable conductance, variable resistance, optical sensors, electromagnetic sensors, or any other suitable pressure sensitive measurement methodology to generate an analog signal based on the amount of pressure applied to the pressure sensitive sensor at any given time.

VPM MCU 220 includes VPM function 224 and may optionally integrate the Alienware™ AlienFx™ lighting function 222, or other custom lighting activity, for reduced printed circuit board (PCB) footprint, component count and bill of materials (BOM) cost. However, a VPM MCU and a lighting function MCU may be physically separate to ensure no compromise in performance or responsiveness. Variable pressure button mechanism 205 may send to VPM function 224 an analog signal representative of the pressure being applied to each of analog buttons 207 and 209. In response to the receipt of the analog signal, VPM function 224 may determine which of the analog buttons are depressed and may convert the amount of pressure to a digital representation of the respective pressure level. A pressure level may represent a range of actual pressures. VPM Function 224 may output a signal indicative of the pressure and the button or buttons that are depressed. The communication between the VPM Function 224 and AlienFx active lighting function 222 may be completely internal to VPM MCU 220 for local lighting control. This means pressure levels sensed in block 224 can directly control the color and backlight intensity in block 222 for visual feedback for the user within the mouse device. An alternative to this is to provide the same visual feedback of the sensed pressure via external lighting devices via the USB bus 244 to the OS.

Alienware AlienFx™ or any other lighting function 222 may control the modification of the backlighting of the mouse 200 alone, or may control the modification of the backlighting of the PC system 250 and/or attached AlienFx or any other lighting enabled peripherals (other than the mouse) based upon the signals it receives from VPM buttons mechanism 205 about the state of variable-pressure buttons 207 and 209. An AlienFx or any other lighting function may be separately installed in PC system 250 and into each additional AlienFx enabled peripheral attached to said PC system 250. This lighting function may divide a computer into regions and enable a user to control the lighting of the regions. In some embodiments, for example, the computer may be divided into multiple regions, including the logo, the power button, and various sections of the keyboard. In response to signals from VPM buttons mechanism 205, Alienware AlienFx or any other lighting function 222 may send signals to control the lighting of mouse 200 through an I2C bus to pulse-width modulation (PWM) current driver 255. An I2C bus connects two devices or components through two two-directional lines. A PWM current driver may control the intensity of lighting by rapidly varying the duty cycle and power sent to a light. In FIG. 2, PWM current driver 255 controls the current sent to RGB LED lights 260. In some embodiments, PWM current driver 255 may control the current sent to each of the components separately. Additionally, the AlienFx lighting function 222 may control effects performed by the lights, such as morphing from one color to another, blinking at various rates, etc. Thus, the colors, intensity of lighting of PC system 250 and lighting effects may change in response to user actions on VPM buttons 207 and 209. In the event that the VPM buttons 207 and 209 provide color, intensity and/or effects changes to the PC system 250 or additionally attached AlienFx enabled peripherals, the pressure events are sent from the VPM MCU 220 via USB bus 244 to communicate this to the PC system's AlienFx controller via the Communication API Layer 345 of FIG. 3.

Standard digital buttons 210 includes buttons 212, 214, and 216. These represent buttons that are detected as either depressed or not depressed. When a digital button is depressed, a digital output signal representing the action is sent to legacy mouse MCU 225 over General Purpose Input/Output (GPIO) pins. GPIO pins are generic, rather than special-purpose, pins which may be controlled through programming. The digital output signal sent through the GPIO pins may also identify the digital button. Optical mouse sensor 230 may project a light, such as a laser, onto the surface over which the mouse travels. Sensors in optical mouse sensor 230 may analyze the reflections to calculate the direction and speed of the mouse. Optical mouse sensor 230 may transmit signals representative of the direction and speed to legacy mouse MCU 225 over a serial peripheral interface (SPI) bus. An SPI bus connects a single master device or component with a single slave device or component over a synchronous serial data link. In response to the signals from standard digital buttons 210 and optical mouse sensor 230, legacy mouse MCU 225 may transmit signals representing the position and motion of the mouse and the state of its digital buttons. In some embodiments, the signals may be in the form of packets. Some of the bits in the packets may represent button states and some of the buttons may contain position and speed information. USB 2.0 hub IC 240 enables the coupling of VPM mouse 200 to PC system 250 over a universal serial bus USB connection. USB 2.0 hub IC 240 may contain multiple USB ports enabling the connection of USB devices or components through USB connections. It may also contain circuitry to control the transmission of signals over the connections. A USB cable may contain four wires. Two may be used to supply electrical power and two may be used for sending data and commands. One port of USB 2.0 hub IC 240 may be coupled to legacy mouse MCU 225 and one port may be coupled to VPM MCU 220. In one embodiment where the AlienFx lighting function is not integrated into the VPM MCU 220, but instead resides in its own physically separate AlienFx MCU, then the AlienFx MCU would need to have a USB interface and connect to a third port of the USB 2.0 Hub IC 240.

Signals from legacy mouse MCU 225 and VPM MCU 220 may be transmitted through USB connection 244 and 246 respectively to USB 2.0 hub IC 240, and from there through USB connection 242 to PC system 250. The signals may report on the state of VPM mouse 200. Similarly, signals from PC system 250 may be transmitted through USB connections to the MCUs 225 and 220. The signals may provide configuration information or may poll the MCUs 225 and 220 about the occurrence of mouse events. Mouse events include the motion and position of a mouse, whether a mouse button is depressed or not, and the pressure level for variable pressure mouse buttons.

In some embodiments, the pressure sensitive buttons of an information handling system keyboard may be further configured to operate in a legacy "on/off" mode of operation (i.e., to emulate normal digital mouse buttons), for example, such as during boot-up prior to loading an operating system, during sleep mode, or any other time a user wishes to operate in such a legacy mode by default. In some embodiments, standard digital buttons may be omitted, and all of the mouse buttons may be variable pressure buttons. In some further embodiments, the legacy mouse MCU may be omitted. In these further embodiments, the VPM MCU may also handle input from an optical mouse sensor.

In the embodiment of FIG. 2, VPM MCU 220 is implemented as a microcontroller. In other embodiments, pressure-sensing digital output circuitry may be implemented as an integrated part of a mouse body. In many embodiments, one or more components and/or processing tasks of pressure-sensing digital output circuitry may alternatively be integrated or otherwise implemented within a microcontroller that is operating as the mouse controller and/or as part of the host system to which the mouse is connected, if desired. One or more of the components of pressure-sensing digital output circuitry could also be implemented with external circuitry, as well. Thus, the components and/or processing tasks of pressure-sensing digital output circuitry may be implemented by any alternative configuration of one or more processing devices such as controller, microcontroller, processor, microprocessor, application-specific integrated circuit (ASIC), field-programmable gate array (FPGA), CPU, etc. of an information handling system or a peripheral component thereof, and alone or together with other types of information handling system processing tasks.

In the embodiment of FIG. 2, legacy mouse MCU 225 is implemented as a microcontroller. In other embodiments, circuitry to receive signals from digital buttons and optical mouse sensors and, in response, transmit signals representative of the state of a mouse may be implemented in any other suitable manner such as with alternate hardware, firmware, and/or software) to perform a legacy momentary on digital key signal generation task.

Figure 3:
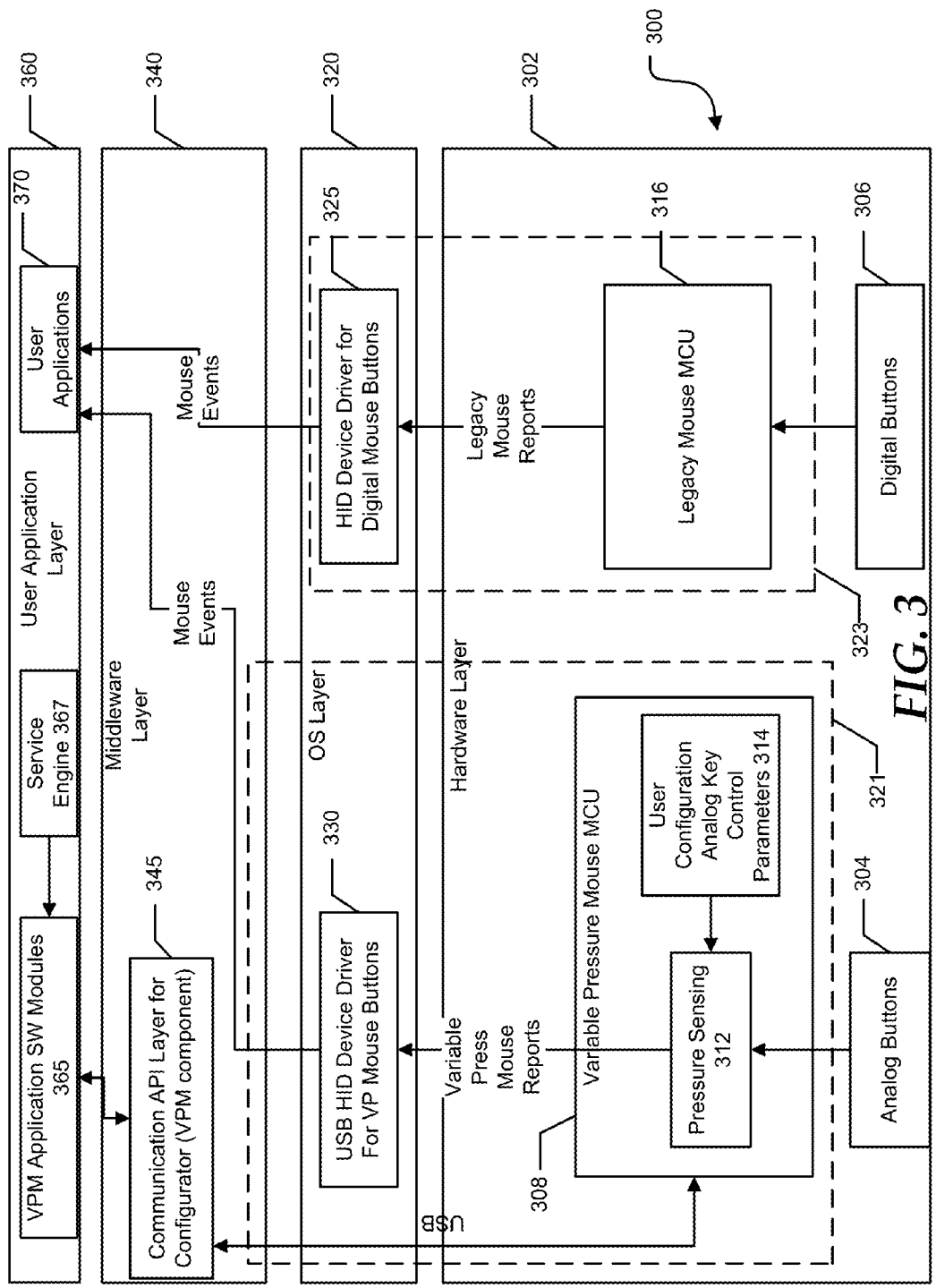
FIG. 3 illustrates a block diagram of a system architecture for a mouse with variable pressure buttons according to one exemplary embodiment of the disclosed systems and methods.

FIG. 3 illustrates an architecture 300 to govern the operation of a VPM such as VPM 200 of FIG. 2. The levels of VPM architecture 300 include hardware layer 302, operating system (OS) layer 320, middleware layer 340, and user application layer 360. Hardware layer 302 includes analog buttons 304, digital buttons 306, VPM MCU 308, and legacy mouse MCU 316. Analog buttons 304 may be similar to variable pressure buttons mechanism 205 of FIG. 2, digital buttons 306 may be similar to standard digital buttons 210, VPM MCU 308 may be similar to VPM MCU 220 of FIG. 2, and legacy mouse MCU 316 may be similar to legacy mouse MCU 225 of FIG. 2.

Upon processing the signals received from analog buttons 304, VPM MCU 308 may broadcast reports of mouse events to one or more user applications 370 residing in user application layer 360. VPM MCU 308 contains pressure sensing component 312 and user configuration analog key control parameters module 314. Pressure sensing component 312 may receive an analog signal representative of the pressure being applied to each of analog buttons 304. User configuration analog key control parameters module 314 may store configuration files for MCU 308. The file may contain parameters to represent settings of a variable pressure mouse. Some parameters may describe the range of pressures assigned to levels of the VPM buttons. Based on the parameters, MCU 308 may assign a first pressure level when pressure sensing component 312 reports a pressure within a first range of pressures, a second pressure level for a pressure within a second range of pressures etc. Other parameters may describe an assignment of macro information to each pressure level value of each mouse button. A macro may represent a type of information sent to an application in a report of mouse events. For an application capable of processing VPM information (a VPM-aware application), the macro corresponding to a pressure level of a button may simply represent that button at that pressure level. In some embodiments, the macro corresponding to a pressure level of a button may represent a combination of buttons and pressure levels. For a legacy application that processes digital or only on/off button signals (signals that indicate whether the button is pressed or not pressed), the macro may represent mouse state that the application may understand rather than the actual mouse state. In some cases, the macro corresponding to a pressure level of a button may represent the button in a pressed state, but with a different repeating rate. The state of the button at a first pressure level may be reported at the normal reporting rate; the state at a second pressure level may be reported at twice the normal reporting rate; and the state at a third pressure level may be reported at three times the normal reporting rate. In some embodiments, the pressure level of a button may be reported as a hot-key, either alone or in combination with other user input. A hot-key is user input that performs a task for an application more quickly than other input to perform the task.

The VPM MCU 308 and Legacy Mouse MCU 316 may operate in parallel, with the VPM MCU 308 processing VPM button activity and the Legacy Mouse MCU 316 processing Legacy button activity. Each MCU sends its respective data to its respective device driver, which is then sent to the User Application 370.

VPM MCU 308 may broadcast reports of mouse events to one or more user applications 370 residing in user application layer 360. In the embodiment of FIG. 3, the reports are transmitted from the VPM MCU 308 to USB Human Interface Device (HID) device driver for VP mouse buttons 330. The output of USB HID device driver for VPM buttons 330 is the VPM button event which is sent to User applications 370. User applications 370 may be, for example, Windows-based applications such as games or non-gaming applications such as Microsoft Office or other business software applications). User applications 370 may be executing from local storage and/or may be cloud-based applications executing from across a network such as the Internet or a corporate area network, etc.

Legacy mouse MCU 316 may process signals from standard (digital or non-variable pressure) mouse buttons and may also process signals representing the speed and direction of the mouse. It may broadcast the reports to one or more user applications 370 residing in user application layer 360. The reports are transmitted from the Legacy Mouse MCU 316 to the HID Device Driver for digital mouse buttons 325, and are then sent to User Applications 370. In many embodiments, legacy mouse MCU 316 may operate similarly to legacy mouse MCU 225 of FIG. 2. In some embodiments, VPM MCU 308 and legacy MCU 316 may be configured to operate in parallel at all times. In other embodiments, they may operate independently. In a few embodiments, a legacy MCU may be omitted and all mouse buttons may operate as variable-pressure buttons.

In the embodiment of FIG. 3, both legacy mouse MCU 316 and VPM MCU 308 may be configured to comply with USB Human Interface Device (HID) standards. USB HID devices are human interface devices, such as keyboards, mice, and game controllers, that connect through a USB connection and follow the USB human interface device class set of specifications. The HID specifications provide a protocol for communications between a device and an operating system.

Also shown in FIG. 3 are operating system (OS) layer 320, middleware layer 340, and user application layer 360. These are software layers that may be executing, for example, on processor 102 of information handling system 100 of FIG. 1. OS layer 320 may include USB HID driver for VPM buttons 330 and USB HID driver for digital mouse buttons 325. A device driver may constitute software that acts as an interface between hardware and an operating system or other higher-level program. The device driver may communicate with the device over a communications bus. It may receive calls from the higher-level program and issue commands to the device in response to the commands. HID drivers may provide an interface between a device conforming to the HID specifications and an operating system. In the embodiment of FIG. 3, driver 330 communicates with VPM MCU 308 through a USB connection and driver 325 communicates with legacy mouse MCU 316 through a USB connection. Drivers 325 and 330 may periodically poll or scan their respective MCUs, process the reports, and broadcast mouse events based on the reports to user applications 370. In some embodiments, the MCU data may be transmitted from each MCU to a single USB hub and from there relayed to the respective drivers. Thus, for example, the legacy mouse reports may be sent to the USB hub and relayed to driver 325.

In many embodiments, such as in the case of a Windows OS, drivers 325 and 330 may both constitute standard in-box drivers. In this case, no original design manufacturer or third-party software is required for OS layer 320 in such an embodiment. Such a characteristic may be employed to provide simplicity and transparency of a VPM such as VPM 200 to the User Applications 370.

Driver 330 may receive reports of mouse states from VPM MCU 308. The reports may indicate the state of the VPM mouse buttons, such as their pressure levels. The reports may also contain other information, such as a reporting rate for mouse events. Driver 330 may then broadcast information about the state of the VPM mouse buttons. The broadcast information may be received and acted upon by user applications 370. Driver 325 may provide reports of the speed and location of a mouse and provide reports of the state of legacy mouse buttons to user application layer 360.

Middleware layer 340 contains communications application programming interface (API) layer for configurator 345, a VPM component. Communications API 345 may be present as a software module that provides applications of user applications 370 access to VPM protocols for the purpose of configuring and monitoring the VPM buttons 304 per a user-defined VPM profile. In some embodiments, communications API 345 may provide an API for the applications. The API may enable the applications to receive assignments of VPM events to commands or other input to the applications. As an example, the VPM event of depressing a button at a first pressure level may be assigned as an instruction to shoot a weapon at a first rate, at a second pressure level may be assigned as an instruction to shoot a weapon at a second rate, and at a third pressure level may be assigned an instruction to detonate an explosive device. As another example, the reporting of the event of a button depressed at a first pressure level may be assigned to instruct a word-processing program to insert a "™" symbol and the reporting of the event of the button depressed at a second pressure level may instruct the program to insert a "©" symbol.

Communications API 345 may also provide a communications link between VPM application software (SW) modules 365 and VPM MCU 308 to enable a user to set parameters for the operation of the VPM MCU 308. For example, when a given VPM profile is enabled, the given profile may be sent from VPM application SW modules 365 to User Configuration Analog Key Control Parameters 314 where it is stored. This information is then loaded into the Pressure Sensing function 312 where live real-time pressure sensor data is compared to this data to correctly output the user desired commands for the given pressed button and the particular pressure level.

In addition, in some embodiments, communications API 345 may monitor for an application with focus. An application may have focus if an operating system directs keyboard input and input from a mouse or other pointing device to the application. In many operating systems, a user may give an application focus by moving a cursor over a window of the application and clicking on the window. An application may also gain focus as a result of being launched. Further, the communications API may be used to send raw data from the Pressure Sensing function 312 via the USB connection to VPM application SW Module to output raw sensor data either for debug purposes, or to provide the user a visual feedback (i.e. bargraph, color change per pressure level) as to how hard the user is pressing on the given key.

User application layer 360 contains VPM application SW modules 365, service engine 367, and user applications 370. User applications 370 may include applications which receive reports of mouse events, such as games. They may include both VPM-aware and non-VPM aware user applications. VPM-enabled user applications may be designed to specifically communicate to the User Configuration Analog Key Control Parameters module 314 via the Communication API with game developer defined VPM profiles. The user may elect to use either the VPM profiles provided by the Game (or User Application 370) or profiles the user created for the game by using the VPM Application SW Module 365.

VPM application software modules 365 may enable a user to create configuration profiles to control the operation of a VPM such as VPM 200. A configuration profile may specify, for example, the correlation of one or more given pressure ranges to pressure levels of a VPM button, with multiple pressure levels being supported for a VPM button. The profile may also specify user definitions of macros. A user may create macros on a per button or button pressure level.

In one exemplary embodiment, a configuration profile may be provided as a file of settings specifying how states of VPM buttons 304 shall be reported for a given user application 370 (game, Microsoft Office application, etc.). Thus, VPM application software modules 365 may provide a configuration profile to customize the behavior of VPM buttons 304 for any given application 370. In many embodiments, VPM application software modules 365 may provide multiple configuration profiles as needed or desired to support multiple applications of user applications 370, multiple users, or even multiple configurations for a user for a single application.

In one exemplary embodiment, VPM application software modules 365 may be configured as a component that is accessible to the user of information handling system 100 in the form of a graphical user interface (GUI) application. Through VPM application SW modules 365, a user may create, maintain, store and enable configuration profiles to control the operation of a VPM such as VPM 200. A configuration profile may specify, for example, the correlation of one or more given pressure ranges to pressure levels of a VPM button, with multiple pressure levels being supported for a VPM button.

In addition, by communicating with user applications 370 through API 345, VPM application software modules 365 may enable a user to define macros to correspond to VPM buttons and pressure levels. Thus, the macros may be created on a per button or button pressure level. Through the interface with the VPM SW application 365 provided by communications API 345, a user may, for example, assign game command to VPM buttons or pressure levels of VPM buttons. In some cases, the user may assign a command to a button, the assignment independent of the pressure level of the button. In other cases, the user may assign multiple commands to a single VPM button, each corresponding to a different pressure level. In some embodiments, a user may create different profiles for different applications. In further embodiments, a user may even create different profiles for the same application. Some embodiments may even store multiple profiles for the same application and the same user. A user may want to change the interpretation of mouse clicks depending on the conditions under which a game played, or depending upon situations within the game.

In some further embodiments, VPM-aware applications may transmit to communications API 345 a list of user commands for the applications. The list of commands may be made available to a user through the GUI. The user may then assign mouse events to the application commands. In that way, through the single interface, the user may both assign pressure levels to pressure amounts and may assign application commands to button events.

In some embodiments, a user may also control the interpretation of VPM buttons for non-VPM-aware applications. Through a GUI provided by VPM application software modules 365, the user may, for example, configure VPM buttons to speed up their mouse event report rate as the degree of pressure applied to the button increases. In some embodiments, this mechanism for configuring the VPM buttons may enable a user to achieve better performance with applications such as video games. The faster reporting rate may enable a user to transmit more clicks to a game through the mouse button that by making the clicks individually. In other embodiments, the user may be able to perform other types of configuration of non-VPM aware buttons through the interface provided by VPM application software modules 365. The user may, for example, be able to specify that a click of a mouse button at a pressure level is reported to a non-VPM-aware application as one or more mouse events that may involve other mouse buttons or may involve multiple mouse buttons. A click on button $b_1$ at pressure level $l_1$ may be interpreted as a click on button $b_2$ followed by a click on button $b_3$. In these embodiments, MCU 308 might then report multiple button clicks based upon the VPM configuration data downloaded into the user configuration analog key control parameters 314.

The configuration profiles data may be stored, for example, onto drive unit 116 and routed to the proper destinations. For example, when a given configuration profile is enabled into effect, the given configuration profile may be sent from VPM application software modules 365 to VPM MCU 308 through the communication API 345. The behavior defined in configuration profiles may, for example, be communicated via the Communication API 345 down via the USB bus into the User Configuration Analog Key Control Parameters module 314. When a particular application 370 is loaded and in effect by the user, applicable set of parameters are outputted from the User Configuration Analog key Control Parameters module 314 into the Pressure Sensing function 312. As a user presses a VPM button 207 at a particular pressure level, the Pressure Sensing function takes the pressure level and particular button identification, checks it against the macro definition of the user set which now resides in the Pressure Sensing function 312, and outputs the macro information for the particular VPM button and pressure level to USB HID device driver 330, which then sends it to the User Application 370.

In some embodiments, the VPM parameter settings file, created by the VPM App SW module 365 and stored as a file on the computer, may automatically be loaded into the User Conf. Analog Key Control Parameters (UCAKCP) module 314 upon the launch of the particular game, or when the particular game becomes in-focus. Service Engine 367 may monitor the computing device in which the layers of FIG. 3 reside to determine which application has focus and which user is signed in. Based on those determinations, Service Engine 367 may select an appropriate set of configuration settings (VPM Profile). In the embodiment of FIG. 3, Service Engine 367 is a separate software utility from VPM App SW module 365. In other embodiments, the Service Engine 367 may reside inside VPM App SW module 365.

In some embodiments the game developer may create a default or preferred VPM parameter setting file. As the game comes in-focus/launched, this file is loaded into UCAKCP module 314. The result is the user only has to go to one place to instruct the particular game how the mouse should behave—in the VPM parameter setting file. This file is stored on the computer, and is accessible by the VPM application SW module 365 whether created by the game developer or the user. There is no need for the user to define the mouse settings behavior in-game as well as with the VPM app SW module 365. A suitable profile may be based upon the game and upon the user. If there are multiple profiles for a game and user, communications API 345 may ask the user which profile the user desires.

Some embodiments may also include a VPM feature on/off switch, or a designated keyboard key, or designated combination of keyboard keys, which allows the user to immediately stop VPM functionality, even with a VPM profile and operation in effect, until such time that the user re-enables VPM functionality with the switch. At that time, the VPM profile in effect will continue to operate. When VPM functionality is turned off, the mouse shall operate as a traditional legacy mouse with traditional on/off buttons, and no variable pressure sensitivity operation. An example for such a need would be a user playing a game with a particular VPM profile in effect, then suddenly having to stop to respond to a chat or IM session by typing and mouse activity which could have otherwise had different functionality than when disabled by this feature.

Embodiments of FIG. 3 may exemplify a framework or architecture for supplying user input in the form of actions on VPM buttons to applications. The framework may enable different pressure levels applied to a single button to be interpreted by an application as different macros. In addition, an action can have a different meaning for one application or user than for another application or user. This framework may also enable the use of standard or in-house device drivers. No custom software would be necessary at the device driver level. Further, in some embodiments, the framework may enable a user, through a single GUI, to both define levels corresponding to pressure ranges on the VPM buttons and to define application commands or other input to the applications corresponding to the mouse events.

The arrangement and number of components, processing devices, processing tasks, and/or features illustrated and described in relation to FIG. 3 is exemplary only. Thus, any other alternative configuration of fewer, additional and/or alternative circuitry and/or logic components may be employed that is suitable for implementing a mouse with one or more individual pressure sensitive buttons, which is capable of outputting different assigned macro information per mouse button pressure level sensed from individual pressure sensitive mouse buttons. Other embodiments may use non-standard device drivers. In further embodiments, these non-standard device drivers may translate pressure ranges to pressure levels or to repeat rates. These non-standard drivers may also poll the VPM-MCU and legacy mouse MCU. In several embodiments, these drivers may have access to configuration profiles in order to perform the translations.

Figure 4:
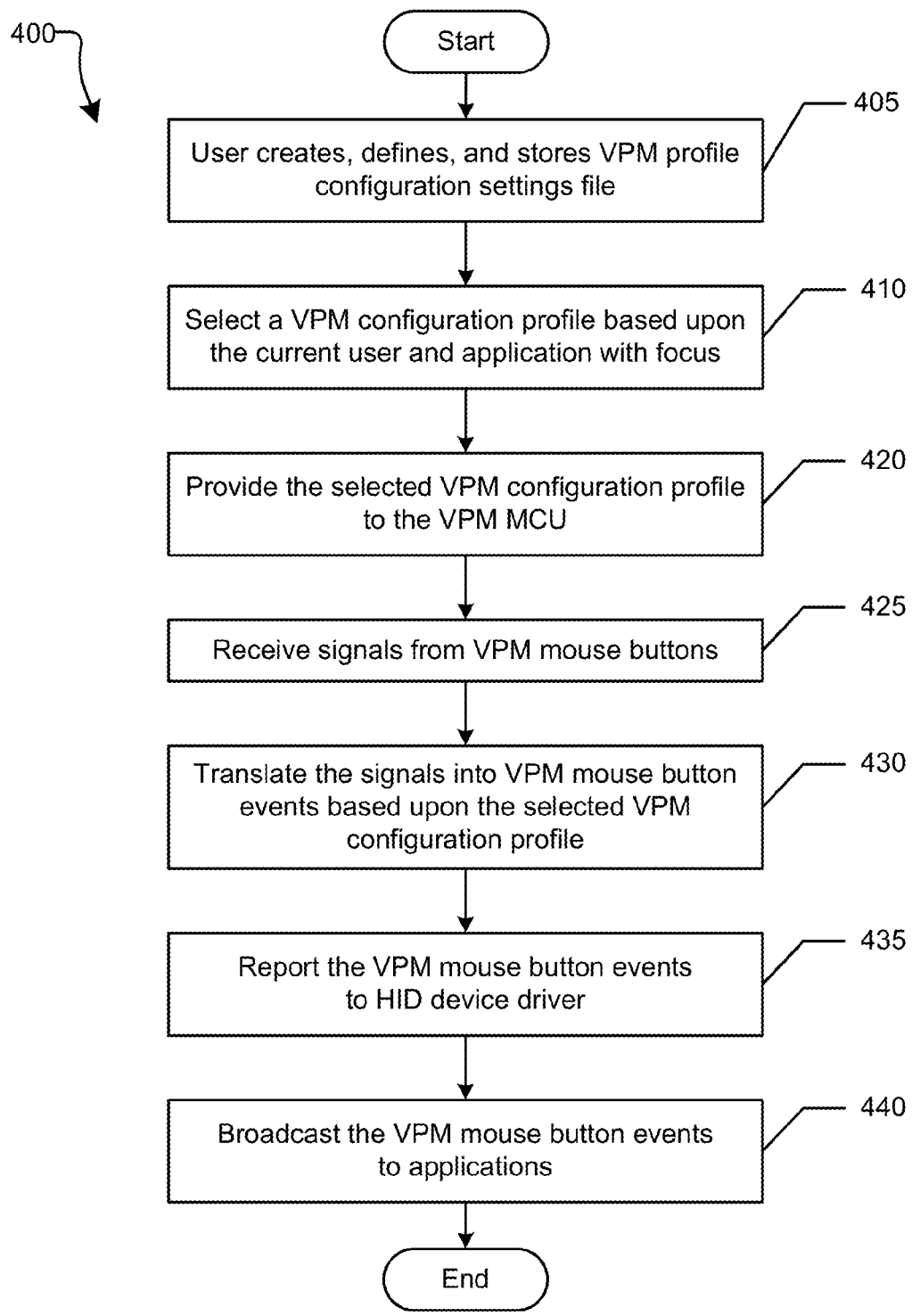
FIG. 4 is a flowchart illustrating a method according to an embodiment of the disclosure.

FIG. 4 is a method 400 of assigning macros to inputs entered on variable-pressure buttons and reporting the macros to user applications. Method 400 starts at block 405, where the user creates and defines macros on a per button or button pressure level at the VPM App SW module 365 and stores them in a VPM configuration settings file (or profile). It is also noted that the Game Developer may also create this file/profile as a desired default for the user. This (and other) VPM profiles are stored as a file on the computer. It is important to note that the application does not need to be VPM-aware as the commands from the in-box device drivers 330 and 325 allow the VPM feature to be invisible to the User application 370 in focus.

The user may create the settings through input to a GUI provided by the VPM-application. When creating a new VPM configuration setting the user may define, for example, which VPM buttons the user wishes to use; how many pressure levels the user wants recognized for each button; if a given button shall operate as a traditional digital or momentary-on button such as mouse reports for the button report an off/off status rather than a pressure level, single-function mode VPM button such as variable on/off switching rate mode that outputs repeating single (legacy) clicks on the button that vary corresponding to the detected key pressure level, or multi-function such as macro mode VPM button; etc. When the user selects to enable multi-function mode for a particular VPM button, the user may also be allowed to define the desired behavior for each recognized pressure level for that button; for example, the user may be allowed to define a command of a game or macro from another application as corresponding to each VPM event.

This user selected macro information for the VPM events may be all saved as a VPM configuration setting for the particular selected application on system storage. In some embodiments, multiple such user-created VPM configuration settings may be similarly created and simultaneously stored on system storage; for example, for later retrieval and use and/or for retrieval as needed by operation of a given application. In some embodiments, multiple users on a single information handling system, such as information handling system 100 of FIG. 1, may create VPM configuration settings for the application. In many embodiments, a single user may create multiple VPM configuration settings for the same application.

At block 410, a module such as Service Engine 367 of FIG. 3 monitors the computing device to determine which application has focus and which user is signed in. Based on those determinations, the Service Engine selects an appropriate set of configuration settings (VPM Profile).

In block 420 the applicable VPM profile gets automatically loaded into UCAKCP module 314, via the USB bus using the Communication API 345. This data then gets loaded into the Pressure Sensing function 312 so that as pressure sensor data comes into the Pressure Sensing function in real-time from the analog buttons 304 (block 425), the pressure sensing function takes the pressure level and particular button identified, checks it against the VPM profile definitions (set by the user), and outputs the appropriate data for the particular VPM button and pressure level (block 425) to the USB HID device driver 330 (block 430) which then sends it to the User Application 370 (block 440). This allows user (or game developer) VPM parameter settings to be loaded into the VPM MCU so the mouse is ready to start operating as a variable pressure mouse as desired by the user as soon as the game launches (or is in focus). For example, a created user profile may be flashed to firmware of VPM MCU 308 from VPM application SW modules 365 via VPM Communication API 345. As a result, VPM MCU 308 may be knowledgeable of the number of pressure level values per individual VPM button that are to be detected and reacted to.

At block 425, a VPM MCU such as VPM MCU 308 may receive signals from VPM mouse buttons. The signals may indicate a button or buttons that are pressed and an amount of pressure. At block 430, the MCU may respond to the detected VPM button events by translating the amounts of pressure into pressure levels. The VPM MCU may also determine a reporting rate for the mouse button based upon the pressure level. In some embodiments, the translation from a button click with an amount of pressure into a pressure level and perhaps into a repeating rate may be performed by firmware (embedded software) in the MCU. The firmware may access configuration profiles provided to the MCU in order to perform the translations.

At block 435, the VPM MCU may report the VPM mouse buttons events to an HID device driver. In some embodiments, the HID device driver may be a standard, "out of the box" device driver. Accordingly, the VPM mouse can be installed without the need to install additional operating system components. At block 440, the HID device drivers broadcast the VPM mouse button events to applications. The applications may then perform steps based upon the reported events.

In some embodiments, the software framework illustrated in FIG. 4 may enable the use of VPMs that is transparent to operating systems and transparent to legacy applications such as games. As a result, the VPMs may be used with the legacy applications. With use of in-box device drivers, the VPM function is invisible to the legacy applications. As a result the VPM mouse is backward compatible with games and other applications written years ago. For VPM-aware applications, embodiments of FIG. 4 may enable a user to set pressure levels based on ranges of pressure applied to mouse buttons and to assign buttons and levels to application commands through a single GUI. Otherwise, the user may be required to engage with a mouse GUI to set levels for the mouse buttons and to engage with an application GUI to assign commands or macros to the mouse events.

Other embodiments may include additional blocks or omit blocks. In some embodiments, the mouse events transmitted by device drivers may be intercepted by a middleware module and translated into other mouse events before being broadcast to applications. In some embodiments, alternated steps may be employed that are suitable for implementing one or more individual pressure sensitive buttons that each support multiple macros, with each macro corresponding to a unique pressure level output, and that is capable of outputting different assigned macro information per button pressure level sensed from individual pressure sensitive buttons.

It will be understood that one or more of the tasks, functions, or methodologies described herein may be implemented, for example, as software, firmware or other computer program of instructions embodied in a non-transitory tangible computer readable medium that is executed by a CPU, controller, microcontroller, processor, microprocessor, FPGA, ASIC, or other suitable processing device or combination of such processing devices.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a user input device comprising a mouse, the mouse including a variable pressure button (VPB);
an application;
a variable pressure microcontroller (VPMCU) coupled to the VPB, the VPMCU including a VPB-translation module;
the VPMCU is to receive the signals generated by the VPB, to translate them into mouse events, and to broadcast the mouse events to the application; and
a VPB configuration module to:
provide an application programming interface to the application and to provide a graphical user interface (GUI) to a user, to enable the user through the GUI to assign amounts of pressure applied to the VPB to pressure levels and to assign the pressure levels in combination with an identity of the VPB to commands or other inputs to the application;
create a configuration profile to represent the user assignments of pressure ranges to pressure levels and the user assignment of pressure levels to the commands or other inputs to the application;
provide to the application through the application programming interface information about the assignment by the user of pressure levels in combination with the identity of the VPB to commands or other inputs to the application; and
provide the configuration profile to the VPB-translation module, wherein:
the VPB is to generate signals regarding amounts of pressure applied to the VPB; and
the VPB-translation module is to translate the amounts of pressure into pressure levels as specified by the configuration profile and to broadcast the commands or other inputs corresponding to the pressure levels to the application.

2. The information handling system of claim 1 wherein:
the information handling system comprises a plurality of applications; and
the VPB configuration module is to create a plurality of configuration profiles and to associate each configuration profile with an application and with the user or another user.

3. The information handling system of claim 2 wherein:
the information handling system further comprises a monitoring module to monitor for a current user and a current application with focus; and
the VPB configuration module is to provide to the VPB-translation module a configuration profile associated with the current user and associated with the current application.

4. The information handling system of claim 1 wherein:
the application is not aware of variable pressure buttons; and
the GUI is to enable the user to assign reporting rates to the VPB based upon the pressure levels for reports to the application.

5. The information handling system of claim 1 wherein the VPB configuration module is to receive a list of user commands from the application through the application programming interface, to provide the list of user commands to the user through the GUI, to receive an assignment of VPB states to user commands from the user through the GUI, and to provide the assignment of VPB states to user commands to the application through the application programming interface.

6. The information handling system of claim 1 wherein:
the information handling system further comprises a lighting system to light up regions of the information handling system;
signals from the VPB regarding amounts of pressure applied to the VPB are to be transmitted to the lighting system; and
the lighting system is to light up the regions of the information handling system in response to the signals from the VPB.

7. The information handling system of claim 1 wherein:
the configuration profile is flashed into non-volatile memory of the VPMCU.

8. An information handling system comprising:
a user input device comprising a mouse, the mouse including a variable pressure button (VPB);
an application;
a variable pressure microcontroller (VPMCU) coupled to the VPB, the VPMCU including a VPB-translation module;
the VPMCU is to receive the signals generated by the VPB, to translate them into mouse events, and to broadcast the mouse events to the application; and
a VPB configuration module to:
provide an application programming interface to the application and to provide a graphical user interface (GUI) to a user, to enable the user through the GUI to assign amounts of pressure applied to the VPB to pressure levels and to assign the pressure levels in combination with an identity of the VPB to commands or other inputs to the application;
create a configuration profile to represent the user assignments of pressure ranges to pressure levels and the user assignment of pressure levels to the commands or other inputs to the application;
provide to the application through the application programming interface information about the assignment by the user of pressure levels in combination with the identity of the VPB to commands or other inputs to the application; and
provide the configuration profile to the VPB-translation module, wherein:
the VPB is to generate signals regarding amounts of pressure applied to the VPB; and the VPB-translation module is to translate the amounts of pressure into pressure levels as specified by the configuration profile and to broadcast the commands or other inputs corresponding to the pressure levels to the application;

the mouse comprises a digital button to generate signals indicating whether the digital button is depressed or not depressed;

the mouse comprises a tracking component to generate signals indicating a direction and speed of mouse movement;

the information handling system comprises a legacy microcontroller coupled to the digital button and the tracking component; and the legacy microcontroller is to receive the signals generated by the digital button and the tracking component and to broadcast events of a location of a cursor and events of a state of the digital button to the application.

9. The information handling system of claim 8 wherein:
the information handling system comprises a first human interface device (HID) driver and a second HID driver;
the broadcasting events by the legacy microcontroller comprises the legacy microcontroller transmitting events to the first HID driver; and
the broadcasting events by the VPB MCU comprises the VPB MCU transmitting events to the second HID driver.

10. The information handling system of claim 9 wherein both the first HID driver and the second HID driver are standard HID drivers.

11. The information handling system of claim 8 further comprising a variable pressure mouse on/off switch to turn variable pressure mouse functionality on and off;
wherein the mouse is to operate as a legacy mouse with the variable pressure mouse functionality turned off.

12. The information-handling system of claim 11 wherein the on/off switch is to immediately turn off the variable pressure mouse functionality when the switch is set to off, even with a variable pressure mouse profile in effect.

13. An information handling system comprising:
a user input device comprising a mouse, the mouse including a variable pressure button (VPB);
an application;
a variable pressure microcontroller (VPMCU) coupled to the VPB, the VPMCU including a VPB-translation module;
the VPMCU is to receive the signals generated by the VPB, to translate them into mouse events, and to broadcast the mouse events to the application; and
a VPB configuration module to:
provide an application programming interface to the application and to provide a graphical user interface (GUI) to a user, to enable the user through the GUI to assign amounts of pressure applied to the VPB to pressure levels and to assign the pressure levels in combination with an identity of the VPB to commands or other inputs to the application;
create a configuration profile to represent the user assignments of pressure ranges to pressure levels and the user assignment of pressure levels to the commands or other inputs to the application;
provide to the application through the application programming interface information about the assignment by the user of pressure levels in combination with the identity of the VPB to commands or other inputs to the application; and
provide the configuration profile to the VPB-translation module, wherein:
the VPB is to generate signals regarding amounts of pressure applied to the VPB; and
the VPB-translation module is to translate the amounts of pressure into pressure levels as specified by the configuration profile and to broadcast the commands or other inputs corresponding to the pressure levels to the application;
the application is a VPB-aware application; and
the application receives data from the VPMCU indicating actual pressure levels via a USB bus and the application programming interface.

* * * * *